United States Patent [19]
Kim et al.

[11] Patent Number: 5,357,453
[45] Date of Patent: Oct. 18, 1994

[54] DISCRETE COSINE TRANSFORM CIRCUIT

[75] Inventors: Ki C. Kim; Byung K. Min, both of Daejeon, Rep. of Korea

[73] Assignee: Electronics and Telecommunications Research Institute, Daejoen, Rep. of Korea

[21] Appl. No.: 175,504

[22] Filed: Dec. 30, 1993

[30] Foreign Application Priority Data

Dec. 30, 1992 [KR] Rep. of Korea ............... 1992-26634

[51] Int. Cl.[5] .......................................... G06F 15/332
[52] U.S. Cl. ................................................. 364/725
[58] Field of Search .............................. 364/725–726

[56] References Cited

U.S. PATENT DOCUMENTS

| | | | |
|---|---|---|---|
| 4,760,543 | 7/1988 | Ligtenberg et al. | 364/725 |
| 4,791,598 | 12/1988 | Liou et al. | 364/725 |
| 4,829,465 | 5/1989 | Knauer et al. | 364/725 |
| 5,181,183 | 1/1993 | Miyazaki | 364/725 |
| 5,249,146 | 9/1993 | Uramoto et al. | 364/725 |
| 5,268,853 | 12/1993 | Tanaka et al. | 364/725 |
| 5,285,402 | 2/1994 | Keith | 364/725 |

*Primary Examiner*—Tan V. Mai
*Attorney, Agent, or Firm*—Spencer, Frank & Schneider

[57] ABSTRACT

A discrete cosine transform circuit including a shuffle circuit with n (n is an integer) shuffle stages, the n shuffle stages sequentially having $2^n$, $2^{n-1}$, ..., $2^1$ input-/output stages in such a manner that a first one of the n shuffle stages has the $2^n$ input/output stages and a nth one of the n shuffle stages has the $2^1$ input/output stages, the nth shuffle stage including first and second RACs for performing a discrete cosine transform using a distributed arithmetic process, the first RAC having $2^{n-2}$ input/output stages, the second RAC having $2^{n-1}$ input/output stages. A path switching section is connected to the input stages of the shuffle circuit for changing a transfer path of output information from the output stages of the shuffle circuit according to whether the discrete cosine transform to be processed is a forward discrete cosine transform or an inverse discrete cosine transform. A first selection section is connected to the input stages of the first RAC and a second selection section is connected to the input stages of the second RAC. The first and second selection sections select information according to whether the discrete cosine transform to be processed is the forward discrete cosine transform or the inverse discrete cosine transform and apply the selected information to the first and second RACs, respectively.

5 Claims, 7 Drawing Sheets

PRIOR ART

DISCRETE COSINE TRANSFORM CIRCUIT

BACKGROUND OF THE INVENTION

1. Field of the Invention

The present invention relates to a forward/inverse discrete cosine transform (referred to hereinafter as DCT) circuit using a distributed arithmetic process.

2. Description of the Prior Art

A distributed arithmetic process is mainly used in signal processing systems. Such a distributed arithmetic process is described in an article entitled, "A New Hardware Realization of Digital Filters" in the IEEE Transactions on Acoustic, Speech and Signal Processing, Vol. ASSP-22, pp. 456–462, December 1974, by A. Peled and B. Lin. Here, it is assumed that a variable X can be obtained on the basis of variables $Y_0 \ldots Y_3$ according to the following equation (1):

$$X = C_0Y_0 + C_1Y_1 + C_2Y_2 + C_3Y_3 \qquad (1)$$

Also, it is assumed that each of the variable X and the variables $Y_0 \ldots Y_3$ can be expressed by a n-bit 2's complement as follows:

$$Y_0 = -2^{n-1}y_0^{n-1} + 2^{n-2}y_0^{n-2} + \ldots + 2y_0^1 + y_0^0 \qquad (2)$$

then, $$\begin{aligned}
X = &-2^{n-1}y_0^{n-1}C_0 + 2^{n-2}y_0^{n-2}C_0 + \ldots + 2y_0^1C_0 + y_0^0C_0 \\
&-2^{n-1}y_1^{n-1}C_1 + 2^{n-2}y_1^{n-2}C_1 + \ldots + 2y_1^1C_1 + y_1^0C_1 \\
&-2^{n-1}y_2^{n-1}C_2 + 2^{n-2}y_2^{n-2}C_2 + \ldots + 2y_2^1C_2 + y_2^0C_2 \\
&-2^{n-1}y_3^{n-1}C_3 + 2^{n-2}y_3^{n-2}C_3 + \ldots + 2y_3^1C_3 + y_3^0C_3 \\
= &y_0^0C_0 + y_1^0C_1 + y_2^0C_2 + y_3^0C_3 \\
&+2y_0^1C_0 + 2y_1^1C_1 + 2y_1^0C_2 + 2y_3^1C_3 \\
&\vdots \\
&+2^{n-2}y_0^{n-2}C_0 + 2^{n-2}y_1^{n-2}C_1 + 2^{n-2}y_2^{n-2}C_2 + 2^{n-2}y_3^{n-2}C_3 \\
&-2^{n-1}y_0^{n-1}C_0 + 2^{n-1}y_1^{n-1}C_1 + 2^{n-1}y_2^{n-1}C_2 + 2^{n-1}y_3^{n-1}C_3
\end{aligned} \qquad (3),(4)$$

In the above equations, the values $\Sigma_{k=0}^{3} 2^i y_k^i C_K$ can be readily be obtained by previously calculating the values $\Sigma_{k=0}^{3} y_k^i C_K$ in all possible cases of $y_k^i$ and storing the calculated values in a read only memory (referred to hereinafter as ROM). The desired value X can finally be obtained by adding the partial sums continuously.

Figure 1:
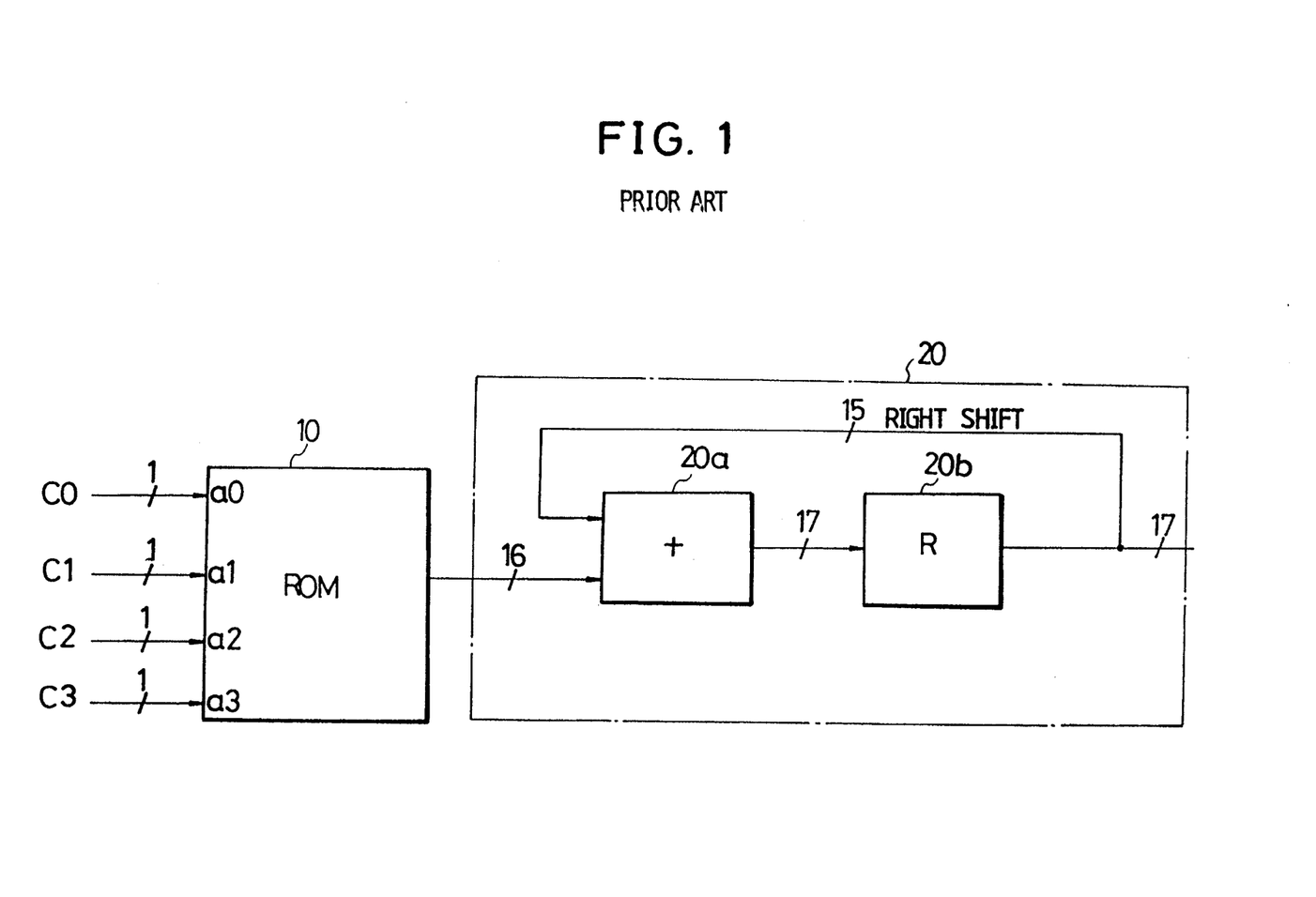
FIG. 1 is a block diagram of a RAC.

FIG. 1 shows one example of circuits performing the above-mentioned distributed arithmetic process. The circuit of FIG. 1 comprises a ROM 10 and an accumulator 20 in cascade, called RAC. This RAC is a basic element in performing the distributed arithmetic process. The accumulator 20 is provided with an adder 20a and a parallel register 20b.

One-dimensional forward and inverse DCTs having N inputs can be defined respectively by the following equations (5) and (6):

$$y_n = 2/N \cdot e_n \sum_{k=0}^{N-1} x_k \cos \pi(2k + 1)n/2N \qquad (5)$$

$$x_k = \sum_{n=0}^{N-1} y_n e_n \cos \pi(2k + 1)n/2N \qquad (6)$$

where, $n, k = 0, 1, \ldots, N - 1$ $$e_0 = 1/\sqrt{2}$$

-continued $$e_1, \ldots, e_{N-1} = 1$$

Figure 2:
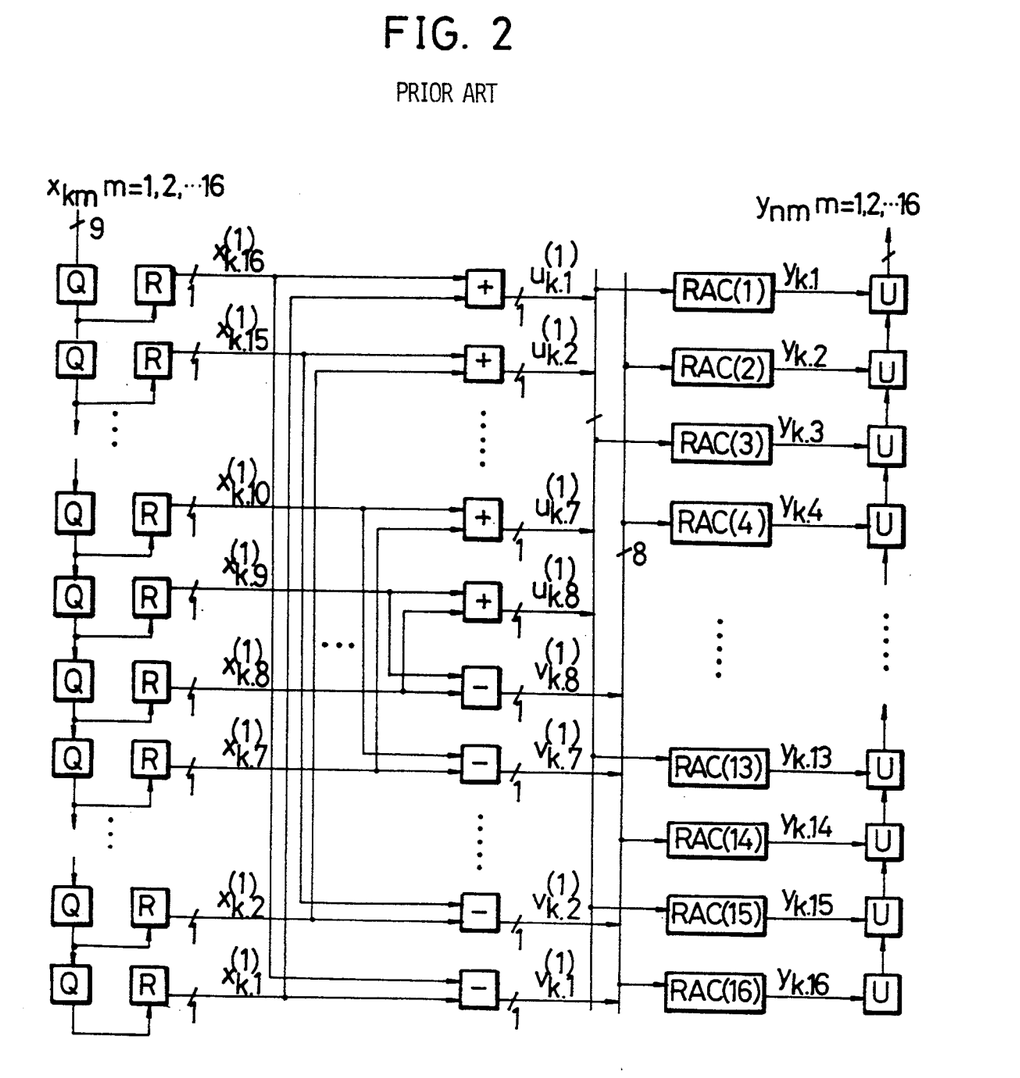
FIG. 2 is a block diagram of a conventional 16-point DCT circuit which is implemented based on a distributed arithmetic process by a M-T Sun.

The DCT was first implemented based on the distributed arithmetic process by a M-T Sun of Bellcore. The M-T Sun implemented a 16-point DCT on the basis of the distributed arithmetic process. FIG. 2 shows a conventional 16-point DCT circuit which is implemented based on the distributed arithmetic process by the M-T Sun (see M-T Sun, T-C Chen and A. M. Cottieb, "VLSI Implementation of a 16×16 Discrete Cosine Transform", IEEE Transactions on Circuits and Systems, Vol. 36, No. 4, pp. 610–617, April 1989, and M-L Lios and M-T Sun, "Two-dimensional Discrete Cosine Transform Processor", U.S. Pat. No. 4,791,598).

In FIG. 2, each of RACs 1–16 is a RAC module provided with a ROM and an accumulator. The RACs are basic elements of the DCT circuit using the distributed arithmetic process and require a large number of components in the circuitry. For this reason, in the implementation of the DCT circuit using the distributed arithmetic process, the number of components and the complexity can be reduced by reducing the number of the RACs and the size of the ROMs therein.

The DCT circuit of FIG. 2 is desirable to obtain the forward DCT but cannot provide the inverse DCT, in that the contents of the ROMs in the RACs are different in the forward and inverse DCTs due to different algorithms. But, the DCT circuit of FIG. 2 may be modified for the implementation of the inverse DCT. In order to implement both the forward and inverse DCTs, additional 8 RAC modules must be provided in the construction of FIG. 2. Namely, 24 RAC modules must be used to implement both the forward and inverse DCTs. According to the prior art, in order to implement a forward and inverse DTCs, the number of RAC modules is generally needed to one and half times more than the number of RAC modules for the only forward DTC or the only inverse DTC.

In the case where the DCT circuit of FIG. 2 is to be applied as a real time 8-point DCT circuit, which yields the result every clock, 12 RAC modules must be used to implement both the forward and inverse DCTs on the assumption that input, output and internal values are 16 bits. Namely, since 8 data transfer paths are present in the DCT circuit, each of them requires 2 RACs to process 2 bits every clock. In this case, 8 of the 12 RACs are required to perform the forward DCT and the remaining RACs are required to perform the inverse DCT.

However, the above-mentioned conventional DCT circuit has a disadvantage in that the components are significantly increased in number and the construction becomes very complex according to function extension.

SUMMARY OF THE INVENTION

Therefore, the present invention has been made in view of the above problem, and it is an object of the present invention to provide a discrete cosine transform circuit for real time-converting spatial domain signals, e.g. video signals, into frequency domain signals using a distributed arithmetic process, in which the number of RACs and the size of ROMs therein are significantly reduced as compared with the prior art circuit, resulting in a simplification in the construction and a reduction in the cost.

In accordance with the present invention, the above and other objects can be accomplished by a provision of a discrete cosine transform circuit comprising a shuffle circuit with n (n is an integer) shuffle stages, said n shuffle stages sequentially having $2^n, 2^{n-1}, \ldots 2^1$ input/output stages in such a manner that a first one of said n shuffle stages has the $2^n$ input/output stages and a nth one of said n shuffle stages has the $2^1$ input/output stages, said nth shuffle stage including first and second RACs for performing a discrete cosine transform using a distributed arithmetic process, said first RAC having $2^{n-2}$ input/output stages, said second RAC having $2^{n-1}$ input/output stages, wherein the improvement comprises path switching means connected to the input stages of said shuffle circuit for changing a transfer path of output information from the output stages of said shuffle circuit according to whether the discrete cosine transform to be processed is a forward discrete cosine transform or an inverse discrete cosine transform; first selection means connected to the input stages of said first RAC for selecting information according to whether the discrete cosine transform to be processed is the forward discrete cosine transform or the inverse discrete cosine transform and applying the selected information to said first RAC; and second selection means connected to the input stages of said second RAC for selecting information according to whether the discrete cosine transform to be processed is the forward discrete cosine transform or the inverse discrete cosine transform and applying the selected information to said second RAC.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

In accordance with the preferred embodiment of the present invention, a description will be mentioned with respect to a real time forward/inverse 8-point DCT circuit which yields the result every clock on the basis of inputs and outputs, which can be expressed by a 16-bit 2's complement.

A forward DCT having 8 inputs can be expressed by the following two equations:

$$\begin{bmatrix} y_0 \\ y_2 \\ y_4 \\ y_6 \end{bmatrix} = \begin{bmatrix} \cos4\theta & \cos4\theta & \cos4\theta & \cos4\theta \\ \cos2\theta & \cos6\theta & -\cos6\theta & -\cos2\theta \\ \cos4\theta & -\cos4\theta & -\cos4\theta & \cos4\theta \\ \cos6\theta & -\cos2\theta & \cos2\theta & -\cos4\theta \end{bmatrix} \begin{bmatrix} x_0 + x_7 \\ x_1 + x_6 \\ x_2 + x_5 \\ x_3 + x_4 \end{bmatrix} \quad (7)$$

$$\begin{bmatrix} y_1 \\ y_3 \\ y_5 \\ y_7 \end{bmatrix} = \begin{bmatrix} \cos\theta & \cos3\theta & \cos5\theta & \cos7\theta \\ \cos3\theta & -\cos7\theta & -\cos\theta & -\cos5\theta \\ \cos5\theta & -\cos\theta & \cos7\theta & \cos3\theta \\ \cos7\theta & -\cos5\theta & \cos3\theta & -\cos\theta \end{bmatrix} \begin{bmatrix} x_0 + x_7 \\ x_1 + x_6 \\ x_2 + x_5 \\ x_3 + x_4 \end{bmatrix} \quad (8)$$

where, $\Theta = \pi/16$.

The above equation (7) can be transformed into the following equation (9):

$$\begin{bmatrix} y_0 \\ y_4 \\ y_2 \\ y_6 \end{bmatrix} = \begin{bmatrix} \cos4\theta & \cos4\theta & 0 & 0 \\ \cos4\theta & -\cos4\theta & 0 & 0 \\ 0 & 0 & \cos6\theta & \cos2\theta \\ 0 & 0 & -\cos2\theta & \cos6\theta \end{bmatrix} \begin{bmatrix} x_0 + x_7 + x_3 + x_4 \\ x_1 + x_6 + x_2 + x_5 \\ x_1 + x_6 - x_2 - x_5 \\ x_0 + x_7 - x_3 - x_4 \end{bmatrix} \quad (9)$$

Namely, the forward DCT can be expressed by the following three equations:

$$\begin{bmatrix} y_0 \\ y_4 \end{bmatrix} = \begin{bmatrix} \cos4\theta & \cos4\theta \\ \cos4\theta & -\cos4\theta \end{bmatrix} \begin{bmatrix} x_0 + x_7 + x_3 + x_4 \\ x_1 + x_6 + x_2 + x_5 \end{bmatrix} \quad (10)$$

$$\begin{bmatrix} y_6 \\ y_2 \end{bmatrix} = \begin{bmatrix} -\cos2\theta & \cos6\theta \\ \cos6\theta & \cos2\theta \end{bmatrix} \begin{bmatrix} x_1 + x_6 - x_2 - x_5 \\ x_0 + x_7 - x_3 - x_4 \end{bmatrix} \quad (11)$$

$$\begin{bmatrix} y_1 \\ y_3 \\ y_5 \\ y_7 \end{bmatrix} = \begin{bmatrix} \cos\theta & \cos3\theta & \cos5\theta & \cos7\theta \\ \cos3\theta & -\cos7\theta & -\cos\theta & -\cos5\theta \\ \cos5\theta & -\cos\theta & \cos7\theta & \cos3\theta \\ \cos7\theta & -\cos5\theta & \cos3\theta & -\cos\theta \end{bmatrix} \begin{bmatrix} x_0 - x_7 \\ x_1 - x_6 \\ x_2 - x_5 \\ x_3 - x_4 \end{bmatrix} \quad (12)$$

Figure 3:
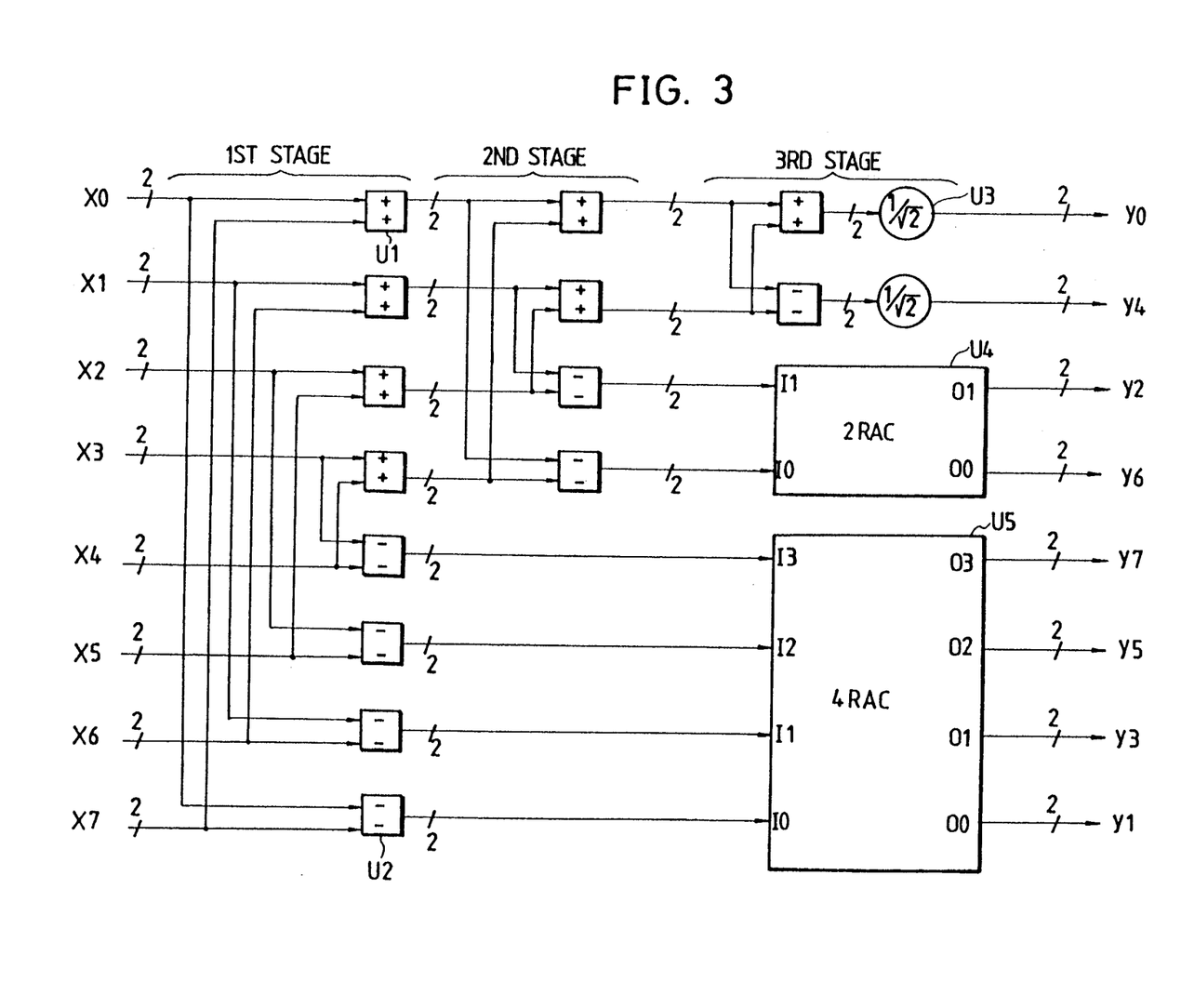
FIG. 3 is a block diagram of an embodiment of an 8-point forward DCT circuit in accordance with the present invention.

Referring to FIG. 3, there is shown a block diagram of an embodiment of an 8-point forward DCT circuit in accordance with the present invention. The above equations (10), (11) and (12) can be implemented by the forward DCT circuit of FIG. 3. Each of inputs X and outputs Y of the forward DCT circuit of FIG. 3 can be expressed by a 16-bit 2's complement.

In FIG. 3, each of the inputs of the forward DCT circuit receives 2-bit information. The forward DCT circuit is shown to comprise three stages. The three stages include a plurality of 2-bit adders U1 and a plurality of subtracters U2. Each of the adders U1 adds two 2-bit inputs and provides a 2-bit output. Each of the subtracters U2 subtracts two 2-bit inputs from each other and provides a 2-bit output. The adders U1 and the subtracters U2 distributed in the first to third stages are adapted to perform addition and subtraction with respect to the inputs on the right sides of the above equations (10), (11) and (12).

As shown in the first to third stages in FIG. 3, each of the inputs is connected to a corresponding one of the adders U1 and a corresponding one of the subtracters U2. This form of circuit is called a shuffle circuit. The shuffle circuit of the first stage has 8 inputs and 8 outputs. The shuffle circuit of the second stage has 4 inputs and 4 outputs. The shuffle circuit of the second stage has 2 inputs and 2 outputs.

A multiplier U3 in the third stage performs a cos 4$\Theta$ multiplication of the above equation (10). The multiplier U3 can be omitted in the implementation of the circuitry by multiplying or dividing the entire inputs and outputs by $1/\sqrt{2}$. Therefore, the multiplier U3 is hardly used in the actual implementation of the DCT circuitry.

The reference numeral U4 designates a RAC which receives two 2-bit inputs and provides two 2-bit outputs. The RAC U4 performs a matrix multiplication of the above equation (11).

The reference numeral U5 designates a RAC which receives four 2-bit inputs and provides four 2-bit outputs, The RAC U5 performs a matrix multiplication of the above equation (12). The RACs U4 and U5 will hereinafter be referred to as 2RAC and 4RAC, respectively.

Figure 5:
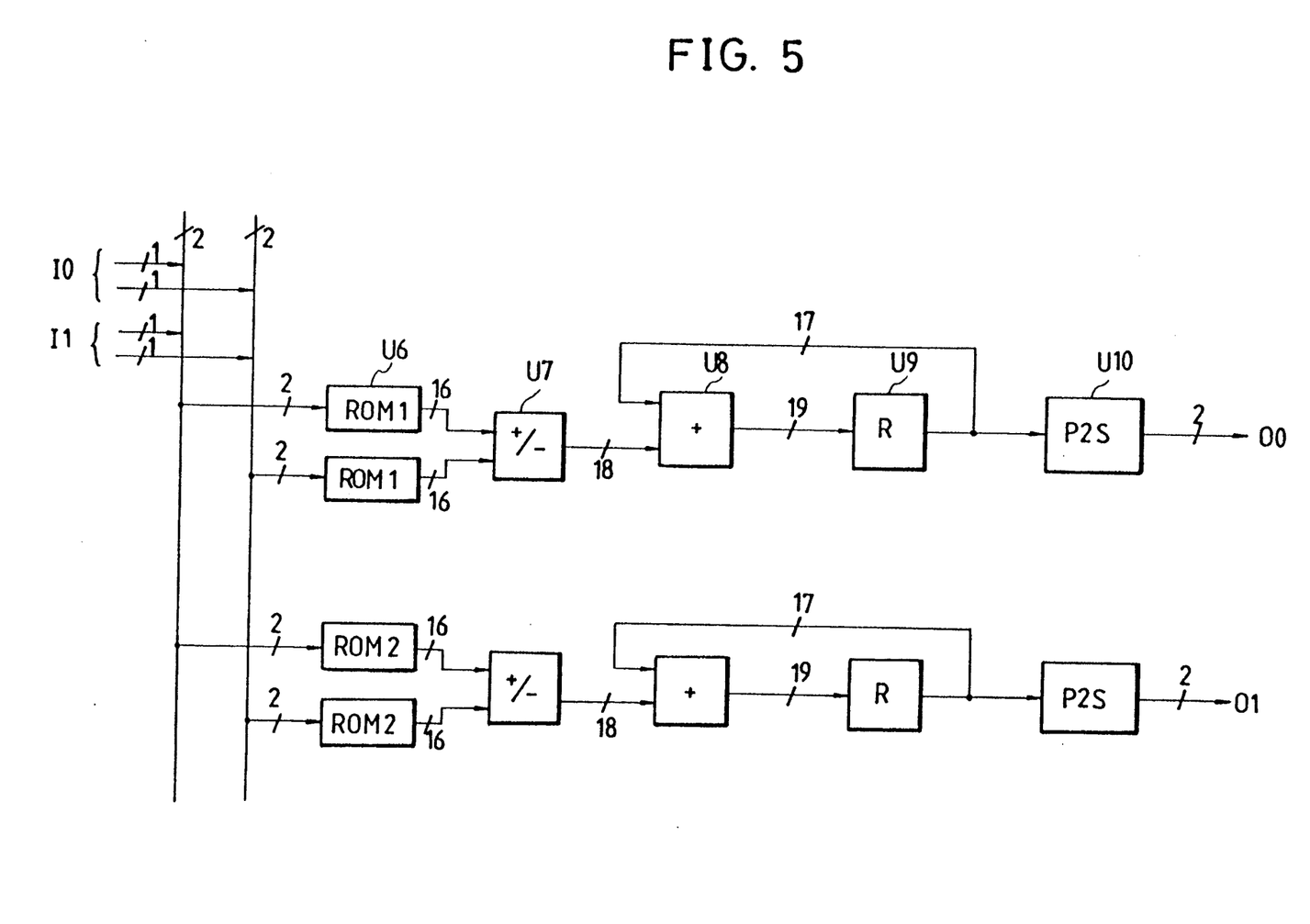
FIG. 5 is a detailed block diagram of a 2-input RAC in FIGS. 3 and 4.

Referring to FIG. 5, there is shown a detailed block diagram of the 2RAC U4. As shown in this drawing, the 2RAC U4 includes a plurality of ROMs U6. Each of the ROMs U6 has two input addresses, in each of which 16-bit data is stored. The contents of the ROMs U6 are determined according to matrices of the above equation (11).

Also, the 2RAC U4 includes a parallel adder/subtracter U7 with two inputs. The parallel adder/subtracter U7 acts usually as an adder, but as a subtracter at an 8th clock.

The 2RAC U4 also includes an adder U8, a parallel register U9 and a parallel/serial converter U10. The parallel/serial converter U10 acts to convert parallel inputs into a 2-bit serial input.

Figure 6:
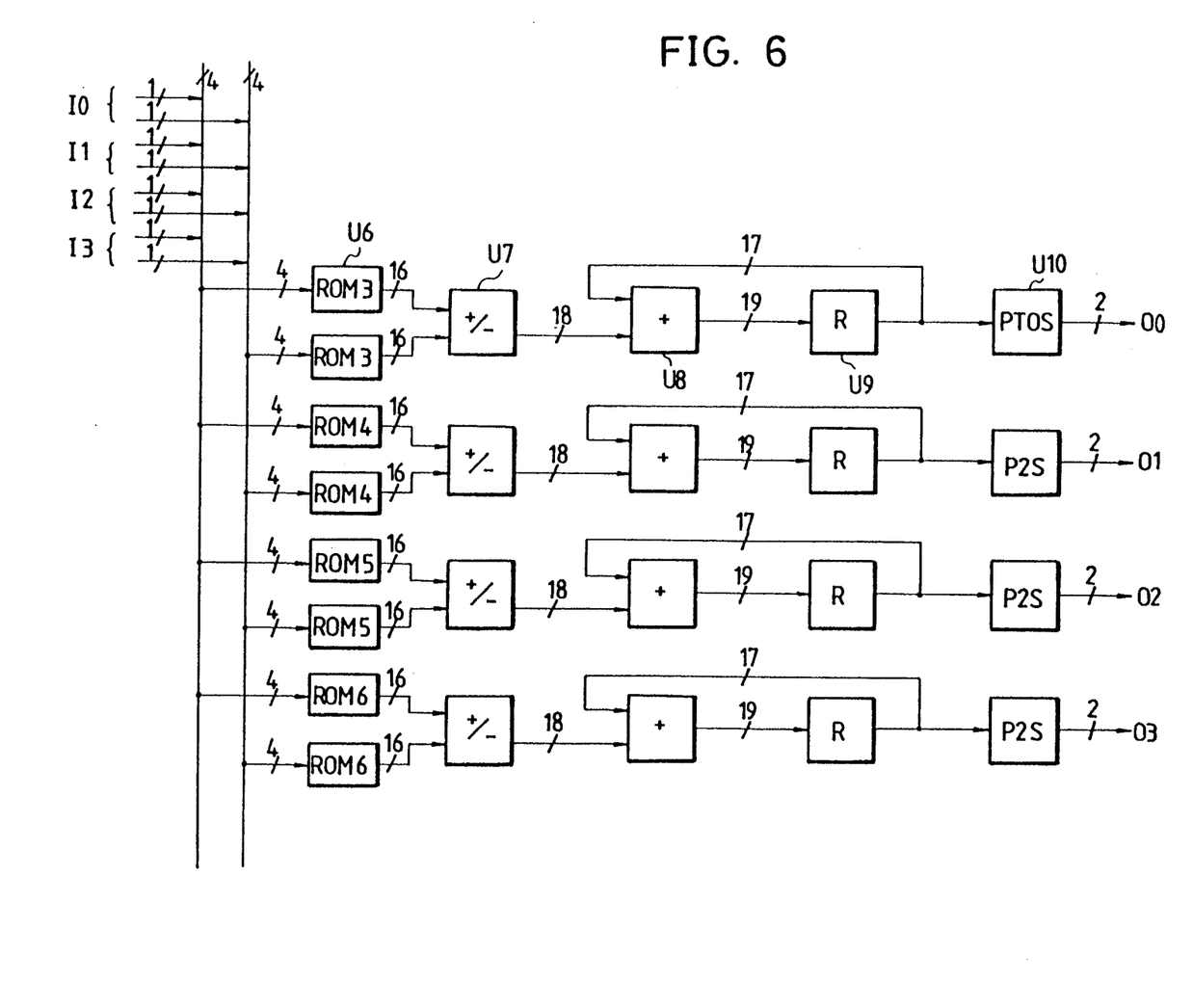
FIG. 6 is a detailed block diagram of a 4-input RAC in FIG. 3 and 4.

Referring to FIG. 6, there is shown a detailed block diagram of the 4RAC U5. The construction and operation of the RAC U5 are substantially the same as that of the 2RAC U4, with the exception that the number of the inputs and outputs is different from that in the 2RAC U4. Similarly, the contents of the ROMs U6 in the 4RAC U5 are determined according to the matrices of the above equation (11).

An inverse DCT having 8 inputs can be expressed by the following two equations:

$$\frac{1}{2}\begin{bmatrix} x_0 + x_7 \\ x_1 + x_6 \\ x_2 + x_5 \\ x_3 + x_4 \end{bmatrix} = \begin{bmatrix} \cos4\theta & \cos2\theta & \cos4\theta & \cos6\theta \\ \cos4\theta & \cos6\theta & -\cos4\theta & -\cos2\theta \\ \cos4\theta & -\cos6\theta & -\cos4\theta & \cos2\theta \\ \cos4\theta & -\cos2\theta & \cos4\theta & -\cos6\theta \end{bmatrix} \begin{bmatrix} y_0 \\ y_2 \\ y_4 \\ y_6 \end{bmatrix} \quad (13)$$

$$\frac{1}{2}\begin{bmatrix} x_0 - x_7 \\ x_1 - x_6 \\ x_2 - x_5 \\ x_3 - x_4 \end{bmatrix} = \begin{bmatrix} \cos\theta & \cos3\theta & \cos5\theta & \cos7\theta \\ \cos3\theta & -\cos7\theta & -\cos\theta & -\cos5\theta \\ \cos5\theta & -\cos\theta & \cos7\theta & \cos3\theta \\ \cos7\theta & -\cos5\theta & \cos3\theta & -\cos\theta \end{bmatrix} \begin{bmatrix} y_1 \\ y_3 \\ y_5 \\ y_7 \end{bmatrix} \quad (14)$$

where, $\Theta = \pi/16$.

The above equation (13) can be transformed into the following equation (15):

$$\frac{1}{2}\begin{bmatrix} x_0 + x_7 + x_3 + x_4 \\ x_1 + x_6 + x_2 + x_5 \\ x_1 + x_6 - x_2 - x_5 \\ x_0 + x_7 - x_3 - x_4 \end{bmatrix} = \quad (15)$$

$$\begin{bmatrix} \cos4\theta & \cos4\theta & 0 & 0 \\ \cos4\theta & -\cos4\theta & 0 & 0 \\ 0 & 0 & \cos6\theta & \cos2\theta \\ 0 & 0 & -\cos2\theta & \cos6\theta \end{bmatrix} \begin{bmatrix} y_0 \\ y_4 \\ y_5 \\ y_6 \end{bmatrix}$$

Namely, the inverse DCT can be expressed by the following three equations:

$$\frac{1}{2}\begin{bmatrix} x_0 + x_7 + x_3 + x_4 \\ x_1 + x_6 + x_2 + x_5 \end{bmatrix} = \begin{bmatrix} \cos4\theta & \cos4\theta \\ \cos4\theta & -\cos4\theta \end{bmatrix} \begin{bmatrix} y_0 \\ y_4 \end{bmatrix} \quad (16)$$

$$\frac{1}{2}\begin{bmatrix} x_1 + x_6 - x_2 - x_5 \\ x_0 + x_7 - x_3 - x_4 \end{bmatrix} = \begin{bmatrix} -\cos2\theta & \cos6\theta \\ \cos6\theta & \cos2\theta \end{bmatrix} \begin{bmatrix} y_6 \\ y_2 \end{bmatrix} \quad (17)$$

$$\frac{1}{2}\begin{bmatrix} x_0 - x_7 \\ x_1 - x_6 \\ x_2 - x_5 \\ x_3 - x_4 \end{bmatrix} = \begin{bmatrix} \cos\theta & \cos3\theta & \cos5\theta & \cos7\theta \\ \cos3\theta & -\cos7\theta & -\cos\theta & -\cos5\theta \\ \cos5\theta & -\cos\theta & \cos7\theta & \cos3\theta \\ \cos7\theta & -\cos5\theta & \cos3\theta & -\cos\theta \end{bmatrix} \begin{bmatrix} y_1 \\ y_3 \\ y_5 \\ y_7 \end{bmatrix} \quad (18)$$

Figure 4:
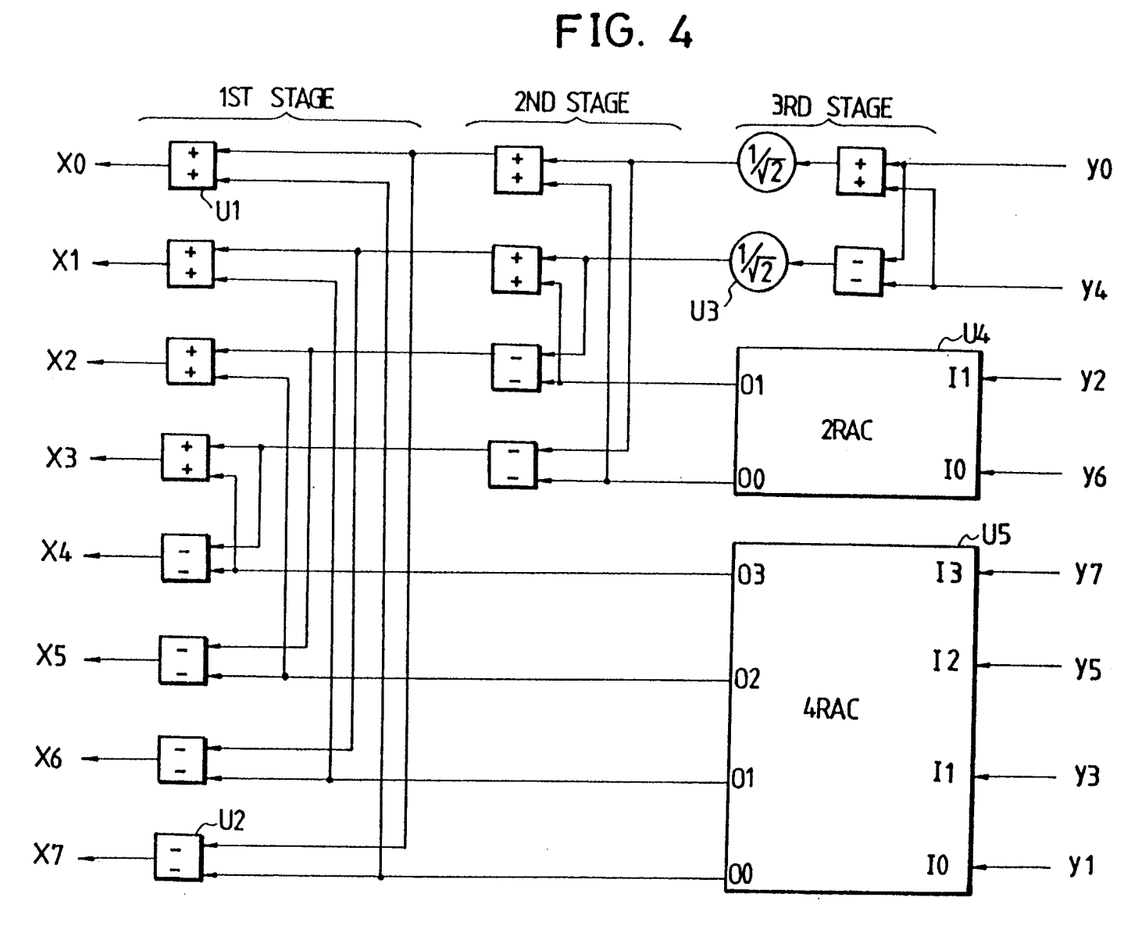
FIG. 4 is a block diagram of an embodiment of an 8-point inverse DCT circuit in accordance with the present invention.

Referring to FIG. 4, there is shown a block diagram of an embodiment of an 8-point inverse DCT circuit in accordance with the present invention. The above equations (16), (17) and (18) can be implemented by the inverse DCT circuit of FIG. 4. In the same manner as in the forward DCT circuit of FIG. 3, each of inputs X and outputs Y of the inverse DCT circuit of FIG. 4 can be expressed by a 16-bit 2's complement. Also, each of the inputs of the inverse DCT circuit receives 2-bit information.

Similarly to the forward DCT circuit in FIG. 3, the inverse DCT circuit is shown to comprise three stages. The components U1-U5 in the inverse DCT circuit of FIG. 4 have the same construction and operation as those in the forward DCT circuit of FIG. 3. Here, the contents of the ROMs of the RAC U4 are determined according to matrices of the above equation (17) and the contents of the ROMs of the RAC U5 are determined according to matrices of the above equation (18).

Multiplication matrices of the above equations (16), (17) and (18) are the same as those of the previous equations (10), (11) and (12). This means that the contents of the ROMs in the forward and inverse DCT circuits in FIGS. 3 and 4 are the same, in addition to the same construction and operation of the components U1-U5. In this connection, a DCT processor can be implemented to perform both the forward and inverse DCTs. This is enabled by providing multiplexers at the inputs and outputs of the first to third stages in FIG. 3.

Figure 7:
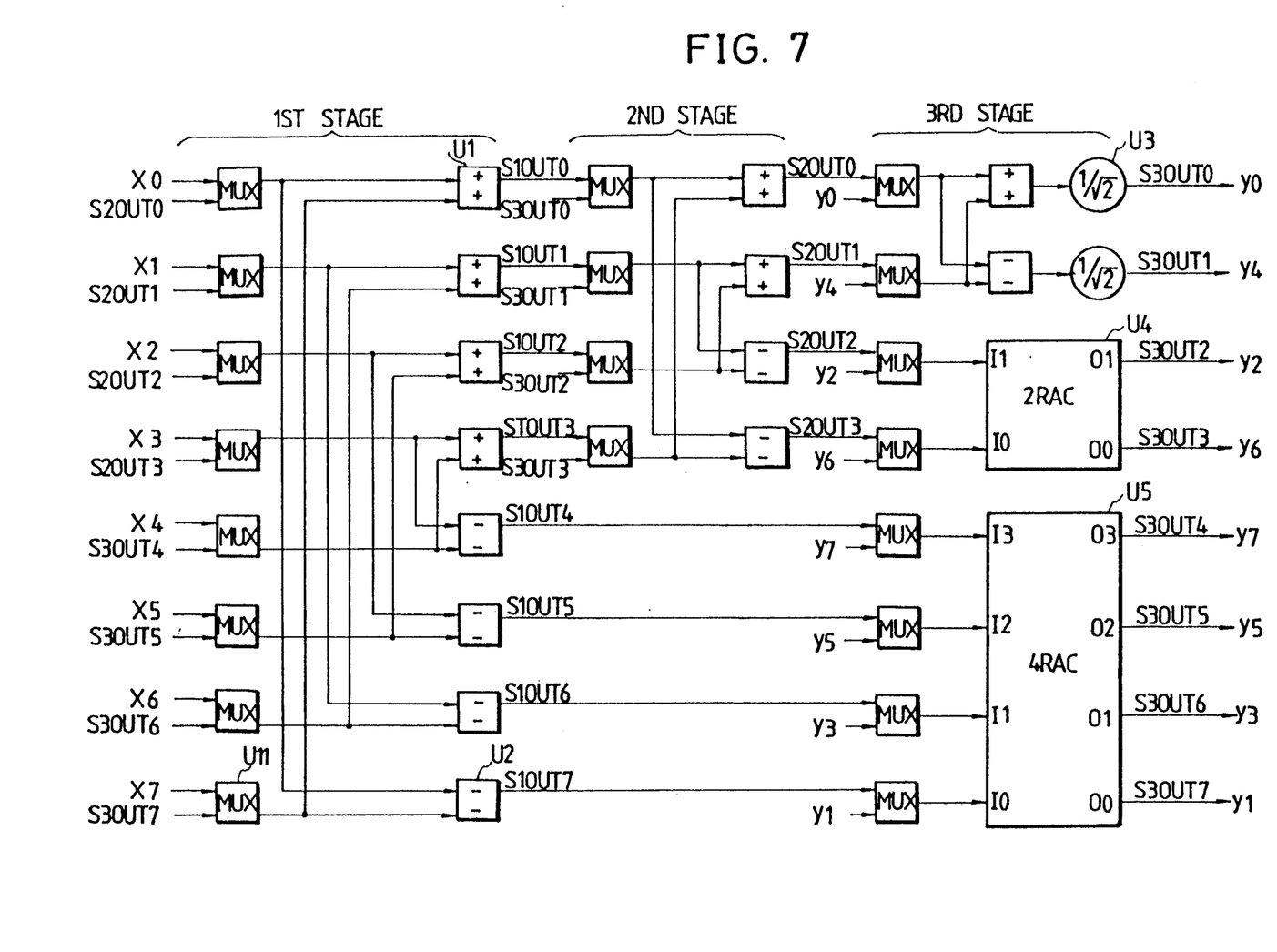
FIG. 7 is a block diagram of an embodiment of an 8-point forward/inverse DCT circuit in accordance with the present invention.

Referring to FIG. 7, there is shown a block diagram of an embodiment of an 8-point forward/inverse DCT circuit in accordance with the present invention. In accordance with the preferred embodiment of the present invention, both the forward and inverse DCTs can be performed by providing multiplexers for the forward DCT in FIG. 3. Also, both the forward and inverse DCTs can be performed by providing multiplexers for the inverse DCT in FIG. 4. The components U1-U5 in the forward/inverse DCT circuit in FIG. 7 have the same construction and operation as those in the forward and inverse DCT circuits in FIGS. 3 and 4. Also, the contents of the ROMs in the component s U4 and U5 are the same as those in FIGS. 3 and 4.

As shown in FIG. 7, the forward/inverse DCT circuit comprises a plurality of multiplexers U11, each of which receives two inputs and provides one output. Each of the multiplexers U11 acts to provide the upper input as its output in the forward DCT implementation, whereas the lower input as its output in the inverse DCT implementation, A signal flow in FIG. 7 is as follows:
1. THE FORWARD DCT IMPLEMENTATION:
   (a) The first stage receives video signals $x_0$–$x_7$ and provides outputs S1OUT0–S1OUT7.
   (b) The second stage receives the outputs S1OUT0–S1OUT3 from the first stage and provides outputs S2OUT0–S2OUT3.
   (c) The third stage receives the outputs S2OUT0–S2OUT3 from the second stage and provides outputs S3OUT0–S3OUT3. Also, the third stage receives the outputs S1OUT4–S1OUT7 from the first stage and provides outputs S3OUT4–S3OUT7. The outputs S3OUT0–S3OUT7 from the third stage are frequency signals $y_0$–$y_7$, which are outputs of the forward DCT circuit.
2. THE INVERSE DCT IMPLEMENTATION:
   (a) The third stage receives the frequency signals $y_0$–$y_7$ and provides the outputs S3OUT0–S3OUT7.
   (b) The second stage receives the outputs S3OUT0–S3OUT3 from the third stage and provides the outputs S2OUT0–S2OUT3.
   (c) The first stage receives the outputs S2OUT0–S2OUT3 from the second stage and provides the outputs S1OUT0–S1OUT3. Also, the first stage receives the outputs S3OUT4–S3OUT7 from the third stage and provides the outputs S1OUT4–S1OUT7. The outputs S1OUT0–S1OUT7 from the first stage are the video signals $x_0$–$x_7$, which are outputs of the inverse DCT circuit.

As apparent from the above description, according to the present invention, the DCT circuitry can be extensionally applied to all the forward and inverse DCTs having $2^n$ inputs. Also, in the implementation of the forward/inverse DCT, the forward DCT and the inverse DCT, the number of the RACs can be reduced to ⅔ or below as compared with the conventional distributed arithmetic process using only one shuffle stage. Namely, in the implementation of the 8-point real time forward/inverse DCT, 6 RAC modules are used according to the present invention, whereas 12 RAC modules are used in the prior art. Further, in the implementation of the forward/inverse DCT, the forward DCT and the inverse DCT, the size of the ROMs in the RACs can be reduced as compared with the conventional distributed arithmetic process using only one shuffle stage. That is, in the implementation of the 8-point real time forward/inverse DCT, each of four of the ROMs requires two input addresses according to the present invention, whereas each of all the ROMs requires four input addresses in the prior art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A discrete cosine transform circuit comprising a shuffle circuit with n (n is an integer) shuffle stages, said n shuffle stages sequentially having $2^n$, $2^{n-1}$, ..., $2^1$ input/output stages in such a manner that a first one of said n shuffle stages has the $2^n$ input/output stages and a nth one of said n shuffle stages has the $2^1$ input/output stages, said nth shuffle stage including first and second RACs for performing a discrete cosine transform using a distributed arithmetic process, said first RAC having $2^{n-2}$ input/output stages, said second RAC having $2^{n-1}$ input/output stages, wherein the improvement comprises:
   path switching means connected to the input stages of said shuffle circuit for changing a transfer path of output information from the output stages of said shuffle circuit according to whether the discrete cosine transform to be processed is a forward discrete cosine transform or an inverse discrete cosine transform;
   first selection means connected to the input stages of said first RAC for selecting information according to whether the discrete cosine transform to be processed is the forward discrete cosine transform or the inverse discrete cosine transform and applying the selected information to said first RAC; and
   second selection means connected to the input stages of said second RAG for selecting information according to whether the discrete cosine transform to be processed is the forward discrete cosine transform or the inverse discrete cosine transform and applying the selected information to said second RAC.

2. A discrete cosine transform circuit as set forth in claim 1, wherein said path switching means includes:
   a plurality of 2 to 1 multiplexers, the number of said 2 to 1 multiplexers being the same as that of the input stages of said shuffle circuit, each of said 2 to 1 multiplexers having two inputs and one output connected to a corresponding one of the input stages of said shuffle circuit, one of said inputs of each of said 2 to 1 multiplexers being connected to a corresponding just previous one of the output stages of said shuffle circuit, the other input being connected to a corresponding just next one of the output stages of said shuffle circuit.

3. A discrete cosine transform circuit as set forth in claim 1, wherein said first selection means includes:
   $2^{n-2}$ 2 to 1 multiplexers, each of said 2 to 1 multiplexers selecting output information from a corresponding just previous one of the output stages of said shuffle circuit if the discrete cosine transform to be processed is the forward discrete cosine transform, selecting inverse input information if the discrete cosine transform to be processed is the inverse discrete cosine transform and applying the selected information to said first RAC.

4. A discrete cosine transform circuit as set forth in claim 1, wherein said second selection means includes: $2^{n-1}$ 2 to 1 multiplexers, each of said 2 to 1 multiplexers selecting output information from a corresponding just previous one of the output stages of said shuffle circuit if the discrete cosine transform to be processed is the forward discrete cosine transform, selecting inverse input information if the discrete cosine transform to be processed is the inverse discrete cosine transform and applying the selected information to said second RAC.

5. A discrete cosine transform circuit as set forth in claim 1, wherein $1/\sqrt{2}$ is used as a constant for multiplying or dividing input/output information in the forward and inverse discrete cosine transforms.

* * * * *